Patented May 21, 1940

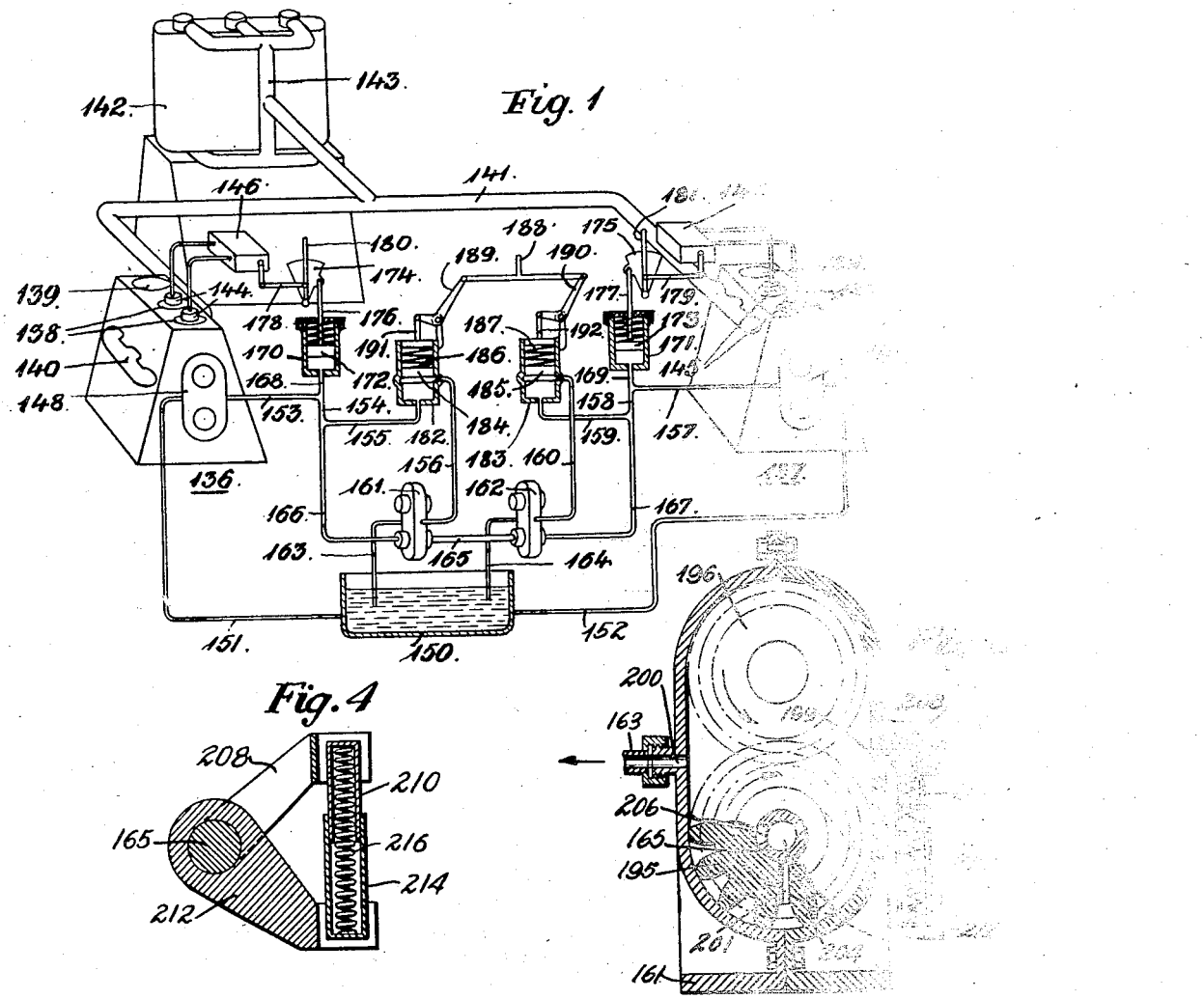

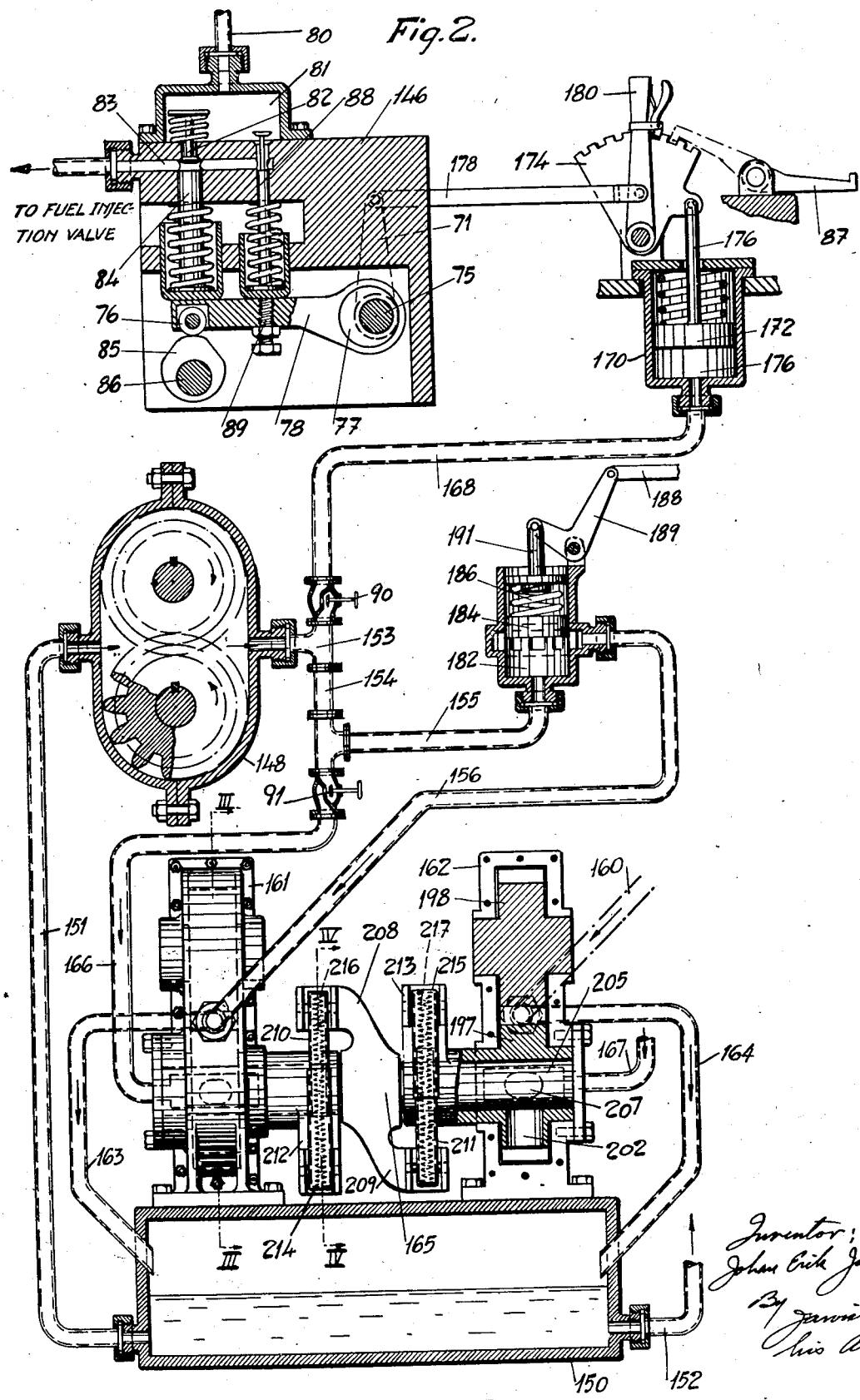

2,201,683

UNITED STATES PATENT OFFICE 2,201,683

PLANT COMPRISING PRESSURE MEDIUM GENERATORS WORKING IN PARALLEL

Johan Erik Johansson, Goteborg, Sweden, assignor to Aktiebolaget Gotaverken, Goteborg, Sweden, a corporation of Sweden Application June 19, 1937, Serial No. 149,085
In Sweden November 9, 1935

4 Claims. (Cl. 60—97)

This invention relates to plants comprising two or more pressure medium generators, which comprise pumps driven by internal combustion engines, and in which the delivery portions of different generators communicate with each other and the pressure medium is used for driving one or more reciprocating or rotating motors or supplied to other pressure medium consumers. The generators in such plants may comprise internal combustion engines driving liquid or elastic fluid pumps and the pressure medium produced by said generators may be compressed air or other gas, a mixture of compressed air and superatmospheric combustion gases from the internal combustion engines, steam, pressure liquid or the like.

In plants of this type it may be desired for different purposes to keep constant, for instance, the numbers of revolutions of the internal combustion engines or the pressure in a common pressure conduit or receptacle, to which the generators supply pressure medium, or to control the outputs of the generators in such a manner that all generators are operated on a predetermined portion of the total output of the plant or so that, for instance, one or more generators operate on constant output, whereas variations of load on the plant are taken care of by other generators, whose outputs stand in a certain relation to each other, or so that the numbers of revolutions of the internal combustion engines or the pressure of the medium produced by the generators are varied in a desired manner, when the load on the plant varies. The invention may, for instance, be employed in plants producing compressed air and comprising two or more compressors working in parallel and driven by internal combustion engines, and adapted to feed a common pressure conduit or receptacle, and in which it may, for instance, be desired to prevent the load from being unequally divided between the different internal combustion engines so that one engine is overloaded or speeds. In such plants it is also often required that the pressure in the pressure conduit or the receptacle fed by the generators be kept constant, or that the variations in pressure be kept within certain fixed limits. The invention may also be employed in other power plants, for instance in the propelling plants of vessels or in mobile plants, such as railroad engines or the like, in which driving gas generators comprising internal combustion engines and air compressors driven thereby and working in parallel are employed for the production of a superatmospheric driving gas mixture for driving main engines and sometimes also auxiliary engines. In a marine plant two or more driving gas generators may be adapted to feed one or more propelling engines and sometimes also auxiliary engines of different kinds. The auxiliary engines are usually operated at fixed numbers of revolutions, and the propelling engine or engines at more or less varying numbers of revolutions and load. In such plants some engines, for instance one or more propelling engines, may be operated on a driving gas mixture of a certain high pressure, whereas the auxiliary engines, and, for instance, one or more propelling engines may be operated on a driving gas mixture of a different pressure.

The invention may also be employed in pump plants comprising pumps driven by internal combustion engines and delivering pressure media of the same or different pressures for one or more purposes, for instance in pump plants for water works, fluid pressure plants providing a driving medium for cranes and other machinery, etc.

The present invention, which takes full consideration of the above mentioned conditions, substantially consists in the provision of fuel supply controlling means for the internal combustion engines consisting of a member common for two or more controlled internal combustion engines and parts cooperating therewith, said member and parts being movable relatively to one another, and said member or parts being directly or indirectly influenced by the numbers of revolutions of said controlled internal combustion engines and connected with fuel supply devices of the different internal combustion engines in such a manner that upon a displacement of the member or one or more of the parts caused by a change in the number of revolutions of the internal combustion engines, which stand in a predetermined relation to each other, such a change of the fuel supply to said internal combustion engines is achieved that the predetermined relation between said numbers of revolutions is restored.

Other features of novelty will be hereinafter disclosed in connection with the description of one embodiment of the invention illustrated in the accompanying drawings, in which:

Fig. 1 is a perspective view of the controlling device of a plant comprising two driving gas generators provided with a hydraulic controlling device, Fig. 2 is a diagrammatic view on a larger scale and partly in section of a part of the hydraulic controlling device employed in the plant illustrated in Fig. 1;

Fig. 3 is a cross-section, on the line III—III of

Figure 5:
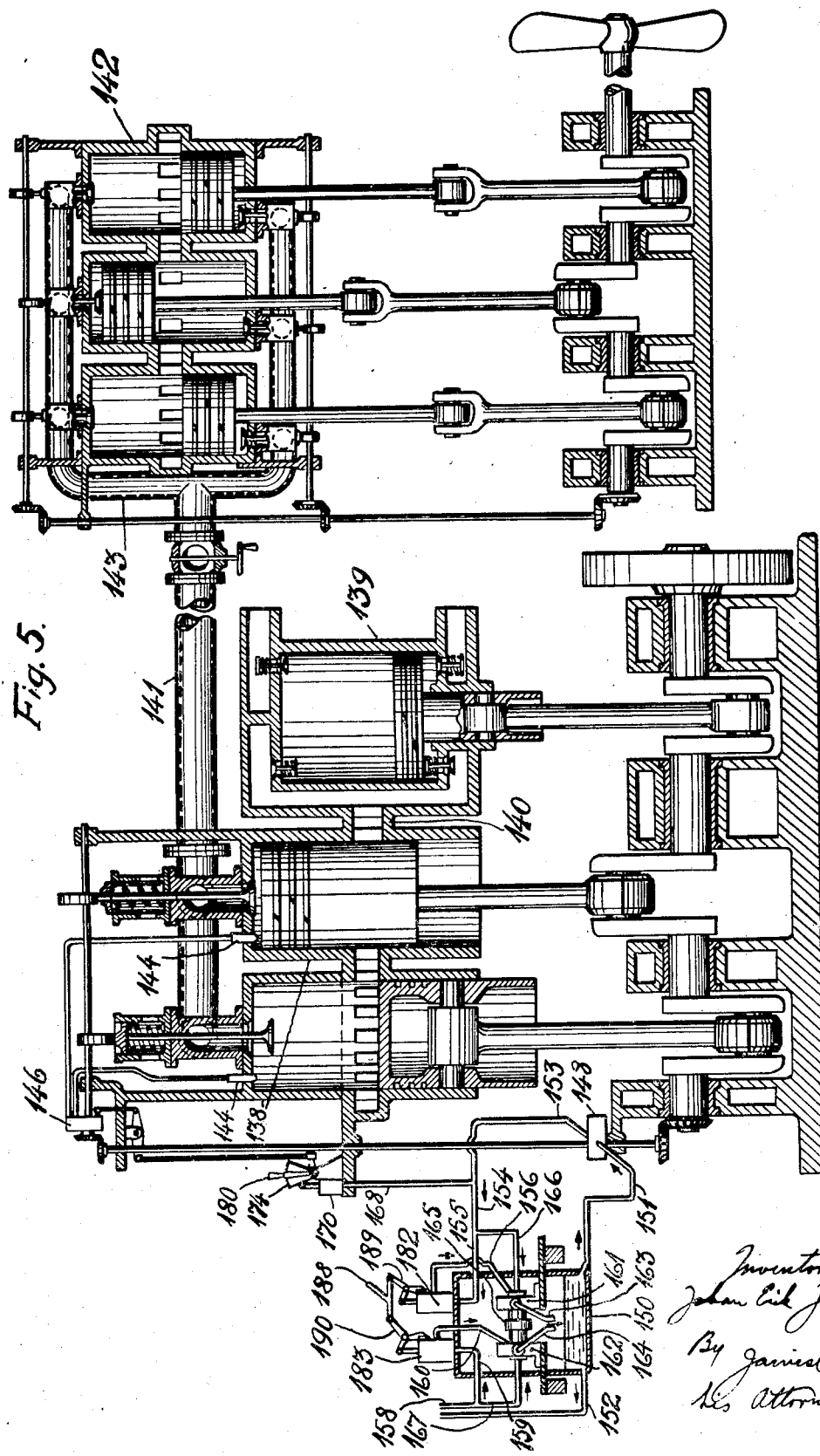

Fig. 2, of one of the hydraulic motors used in the controlling device illustrated in Figs. 1 and 2;

Fig. 4 is a cross-section on the line IV—IV of Fig. 2; and

Fig. 5 is a longitudinal section of one of the driving gas generators diagrammatically illustrated in Fig. 1 and of a propelling engine driven by the gas produced by the generators as indicated diagrammatically in Fig. 1.

Fig. 1 is a diagrammatic view of a plant, in which pressure medium generators comprising pumps driven by internal combustion engines are included and in which said generators produce a pressure medium and supply the same to a conduit common for two or more generators and the generators are provided with fuel supply controlling means, which will be more particularly described hereinbelow.

The plant illustrated in Fig. 1 comprises two driving gas generators 136 and 137, which may, for instance, each comprise two Diesel cylinders 138 and a compressor cylinder 139 built together therewith and communicating therewith through conduits 140. A typical construction of such apparatus, which per se may be varied in design within the scope of the present invention, is shown more fully in Fig. 5. Each driving gas generator supplies a driving gas mixture to a conduit 141 or other receptacle common for both generators, said driving gas mixture being comprised by the combustion gases of the internal combustion engines 138 and compressed air from the compressors 139, which may be mixed with the combustion gases of the internal combustion engines somewhere after said engines or may pass totally or partially through the internal combustion cylinders. The driving gas mixture is supplied to the top and bottom of the cylinders of a double-acting three-cylinder reciprocating engine 142 through a manifold 143, and the engine 142 may be connected to the propeller shaft of a vessel or any other stationary or mobile machinery.

Fuel is supplied to the internal combustion cylinders 138 through fuel injection valves 144, 145 and fuel supply controlling devices 146, 147, which may be of any suitable type and, for instance, constructed in a manner similar to the fuel pumps illustrated in Figs. 4 and 10 of my copending application Serial No. 186,090. Fig. 2 in the accompanying drawings illustrates such a fuel supply control device in section on a large scale, and furthermore, this figure and Figs. 3 and 4 illustrate in detail the hydraulic controlling device of the generator 136 and a part of the controlling device of the generator 137 cooperating therewith. In the embodiment of the invention illustrated in Figs. 1 to 5 a gear pump 148, 149, respectively, is connected to each driving gas generator and driven by the respective generator, said gear pump being adapted to draw a liquid such as oil from a receptacle 150 through pipes 151 and 152, respectively, and to pump said oil through pipes 153, 154, 155, 156 and 157, 158, 159 and 160, respectively, to hydraulic motors 161 and 162, which in the present case are illustrated as gear motors. From the gear motors 161 and 162 the oil flows back through pipes 163 and 164, respectively, to the receptacle 150. In Fig. 2 the gear motor 161 is illustrated in side elevation and the gear motor 162 in vertical section. The gear motors are connected to each other by means of a shaft so arranged as to cause the motors to rotate together, but to permit a certain angular displacement between the motors. The gear motors 161 and 162 are arranged in such a manner that if one motor tends to increase its number of revolutions relatively to the other a by-pass 166 or 167, respectively, is opened in the gear motor, whose number of revolutions is increasing. The oil pressure at the pressure side of said gear motor is then reduced due to the reduced resistance to the oil flow from the respective gear pump to the receptacle 150 in the respective gear motor, and as a result therefrom the fuel supply to the corresponding driving gas generator is reduced. For this purpose pipes 168 and 169 are connected to the pipes 153, 154 and 157, 158, respectively, said pipes 168, 169 forming communications between the pressure side of the gear pumps 148, 149 and cylinders 170, 171, respectively, in which spring-actuated pistons 172, 173 are movable. The pistons 172 and 173 are connected to regulating sectors 174, 175, respectively, by means of connecting rods 176, 177, respectively, said sectors being connected to the fuel supply control devices 146, 147, respectively, by means of links 178, 179, respectively, or the like. Manual adjustment of the fuel supply is obtained by means of levers 180, 181, which may be locked in different positions relatively to the sectors 174, 175 by means of suitable locking devices as illustrated in detail in Fig. 2. The fuel supply control device 146 is illustrated in section in Fig. 2. The link 178 is connected to a lever 71 secured on the shaft 75, which has an eccentric 77 for each cylinder of the internal combustion engine secured thereon. The eccentric 77 actuates one end of a lever 78 bearing with a roller 76 on a cam 85 provided on a shaft 86 driven in any suitable manner from the internal combustion engine 136 and making one revolution each time a fuel injection is desired in the cylinder corresponding to the cam 85. Fuel is supplied to the fuel pump through a pipe 80 and is admitted from the chamber 81 through an opening controlled by a valve 82 to the pressure chamber 83. A plunger 84 is pressed into the chamber 83 against the action of a spring by means of the cam 85 on the shaft 86. A spring loaded valve 88 is provided in the wall between the pressure chamber 83 and the chamber 81. An abutment such as an adjusting screw 89 or the like on the lever 78 is adapted to press the valve 88 in certain positions of the cam 85 and the eccentric 77 and thereby to cause the valve 88 to open and the pressure in the chamber 83 and the fuel injection to cease. The opening of the valve 88 occurs during the pressure stroke of the pump plunger 84 and interrupts the high injection pressure produced by said plunger at an earlier or later stage of the plunger stroke so that a smaller or larger fuel quantity is injected in the internal combustion cylinder, according to the momentary positions taken by the levers 71 and 78. Thus the fuel supply is reduced or increased according to the positions taken by the piston 172 and the setting of the arm 180 relatively to the sector 174. Cylinders 182, 183 are inserted in the pressure pipes 155, 156 and 159, 160, respectively, the outlet openings of said cylinders, which communicate with the pipes 156, 160 being controlled by pistons 184, 185, respectively, displaceably mounted in said cylinders and connected to springs 186, 187 actuated by means of a device 188 acting through levers 189, 190 and rods 191 and 192 connected to said springs. The pressure in the cylinders 182, 183 may be adjusted at will be means of the pressure controlling device 188.

Figs. 2, 3, and 4 show in detail an embodiment of the gear motors 161 and 162. In this embodiment said motors comprise casings having gear wheels 195, 196 and 197, 198, respectively, mounted therein. Each motor casing is provided with an inlet opening 199 and an outlet opening 200, as illustrated in Fig. 3. The gear wheels 195 and 197 are each provided with a radial duct 201 and 202, respectively, opening in the bottom of a tooth gap of the respective gear wheel. The gear wheels 195, 197 are rotatably mounted on a common shaft 165 provided at each end with a bore 204 and 205, respectively, with which the by-pass pipes 166 and 167, respectively, are connected. Said bores may, in a certain angular position of the gear wheels relatively to the common shaft 165, be brought into communication with the ducts 201 and 202 through openings 206 and 207, respectively. The shaft 165 is provided with two arms 208 and 209 having sleeves 210 and 211, respectively, pivotally mounted therein. Each hub of the gear wheels 195, 197 is elongated, as illustrated in Figs. 2 and 4, and forms an arm 212 and 213, respectively. Sleeves 214 and 215 are pivotally mounted in said arms, the open ends of said sleeves being slidably mounted on the sleeves 210, 211, respectively. Helical springs 216, 217 are provided within the sleeves 210, 214 and 211, 215, as illustrated in detail in Fig. 4, and connected with their ends to the sleeves.

In this manner an elastic coupling between the gear wheels 195 and 197 is obtained, which permits a certain angular displacement of the gear wheels relatively to each other, whereas said gear wheels are simultaneously caused to follow each other's movements.

Obviously, if one gear motor tends to increase its number of revolutions relatively to the other, a moment is transmitted from one gear motor to the other through the shaft 165. The duct 201 or 202, respectively of the gear wheel 195 or 197, which tends to increase its number of revolutions, is then turned in such a manner that the inner opening of said duct opens a communication to the opening 206 or 207, respectively in the shaft 165. Thus a by-pass through the pipes 166 or 167, respectively is opened at the gear motor, which tends to increase its number of revolutions, since the oil from the pressure side of the motor gets a more or less unobstructed passage through the respective duct 201 or 202, opening 206 or 207, and bore 204 or 205, substantially while the tooth gap communicating with the duct passes through the outlet chamber of the respective gear motor. Consequently, the pressure falls in the oil pipes at the pressure side of said gear motor causing the oil pressure in the cylinder 170 or 171, respectively, communicating with the respective pressure pipe to fall and the piston moving in said cylinder to move downwards, see Figs. 1 and 2, under the influence of the spring, and to reduce the fuel supply to the respective internal combustion engine.

The controlling means illustrated in Figs. 1 to 5 operate in the following manner:

If, for instance, the pressure controlling device 188 is adjusted in such a manner that the spring pressures on the two pistons 184 and 185 are the same, the pressures prevailing in the cylinders 182 and 183 will be equal, if the piston areas are of the same size. The levers 180 and 181, which are manually adjusted for a certain desired output of the driving gas generators, may, for instance, be adjusted in such positions that the same fuel quantities are supplied to the driving gas generator 136 and to the driving gas generator 137. If the generators are equal and supply a driving gas mixture to the common conduit 141 or other receptacle, said generators will apparently run at the same number of revolutions. It is further assumed that the pistons 172, 173 then take the positions indicated in Fig. 1. It is then obvious that, as long as the load on the driving gas generators is not changed, the pressures in the pressure pipes 156, 160 remains constant, the gear motors 161, 162 run at exactly the same numbers of revolutions, and no moment is transmitted by the shaft 165 between the gear motors. The arms 208, 209 and the arms 212, 213 formed by the hub portions of the gear wheels 195, 197 are then rotating together with the gear wheels, and the gear wheels take the positions relatively to each other and to the shaft 165 illustrated in Figs. 2, 3, and 4.

Now, if, for instance, by some reason the number of revolutions of the driving gas generator 136 falls, the number of revolutions of the gear pump 148 is also reduced correspondingly. The oil quantity delivered by the pump 148 is then also reduced and the number of revolutions of the gear motor 161 consequently tends to decrease. Then the gear motor 162 transmits a twisting moment to the motor 161 through the shaft 165 resulting in a certain angular displacement of the shaft 165 relatively to the gear wheels 195 and 197. Said angular displacement is continuously increased, whereas the pressure in the pipe system 153, 154, 155, which is dependent upon the spring pressure on the piston 184, remains substantially constant, and the piston 184 is displaced somewhat downwards and throttles the oil flow to the pipe 156. Due to the angular displacement between the gear wheel 197 and the shaft 165 the inner end of the duct 202 is gradually moved towards the opening 207 until communication is obtained between the outlet side of the gear motor 162 and the bore 205. Obviously, the opening 206 simultaneously moves away from the duct 201 and the springs 216 and 217 are compressed. Then the oil can pass the gear motor 162 with reduced resistance, and flow through the by-pass 167 to the outlet side of said gear motor. Consequently, the pressure in the cylinder 171 falls and the piston 173 moves downwards, see Fig. 1, so that the fuel supply to the generator 137 and the number of revolutions of said generator are reduced. This reduction continues as long as there is a tendency of difference in the number of revolutions between the driving gas generators 136 and 137.

If now, for instance, the number of revolutions of the driving gas generator 136 by some reason increases, the oil quantity pressed through the pipe system 153, 154, 155, 156 rises. The piston 184 is then pressed upwards and an increased oil quantity is supplied to the gear motor 161. Consequently, the number of revolutions of said motor increases, and a moment is transmitted to the gear motor 162. A relative angular displacement between the gear wheel 195 and the shaft 165 then occurs in such direction that the duct 201 is turned towards the opening 206, and a by-flow of oil through the duct 201, opening 206, bore 204 and by-pass pipe 166 takes place. This results in a reduction of the oil pressure in the cylinder 170 and a downward movement of the piston 172 and consequently a reduction of the fuel supply to the driving gas generator 136 and a reduction of the number of revolutions of said generator, until both generators are again running at the same speed.

If the total output of the plant is desired to be changed the oil pressure controlling device 188 is manually adjusted so that the tension of the springs 186, 187 acting upon the pistons 184 and 185, respectively, is increased or reduced. This adjustment may naturally also be made automatically. If the tension of the springs is increased, i. e. if the operating lever of the pressure controlling device 188 is moved to the left in Fig. 1, the oil pressures in the pipes 153, 154, 155 and 157, 158, 159 are increased. Then, the oil pressures in the cylinders 170 and 171 are also increased, and the pistons 172 and 173 are pressed upwards and both driving gas generators 136 and 137 are supplied with greater fuel quantities. The driving gas generators are then running at a mutually equal but higher number of revolutions than that, at which they were running on the prior adjustment of the lever 188. Correspondingly, the fuel supply to the driving gas generators and the oil pressures in the pressure pipes of the pumps 148 and 149, respectively, and the chambers connected thereto are reduced, if the operating lever of the pressure controlling device 188 is moved to the right in Fig. 1, so that the spring pressure on the pistons 184 and 185 is reduced.

Obviously controlling means of the type described in connection with Figs. 1–5 may be used whether the plant comprises driving gas generators producing a super-atmospheric driving gas mixture or a number of compressors or pumps driven by internal combustion engines and supplying a gaseous or liquid pressure medium to a conduit or other space common for two or more pressure medium generators. The plant illustrated in Fig. 1 may naturally also comprise more than two engines working in parallel. In the plant described in connection with Figs. 1–5 the internal combustion engines working in parallel comprised in the plant are continuously driven at the load, for which the plant is adjusted, since, upon a change of the operating conditions of one engine, the controlling means influenced by the engines operating in parallel actuates the supply of fuel to the controlled internal combustion engines so that the equal distribution between the different engines is restored. In all plants according to the invention the total fuel supply to the generators may be dependent upon the pressure or quantity of the medium produced by the generators or the numbers of revolutions of one or more of said generators and adjusted through automatically or manually operated means.

If more than two generators are driven in parallel a gear motor of the type indicated in Figs. 1–5 may be associated with each generator in the same way, as illustrated in Fig. 1, and the gear motors of all generators comprised in such a plant may be coupled by a transmission of the type indicated in Figs. 1–5. Where gear motors are used it is obvious that several ducts 201 and 202 may be provided in the gear wheels of the motors, and also several openings 206, 207, respectively.

If, for instance, in the plant according to Fig. 1, it is desired to drive one generator with constant output, the fuel controlling device of said generator may be locked by means such as a swingable pawl 87, Fig. 2, which is somewhat offset relative to the arm 180 in order not to interfere therewith, and which may engage the sector 174, as indicated in dotted lines in Fig. 2. The piston 172 or 173, respectively, may then, if desired, be disengaged from the sector 174 or 175, respectively, in any suitable manner. A valve 90 provided in the pipe 168 or 169, respectively, may serve the same purpose as the pawl 87. If the back pressure of the driving gas generators or other pressure medium generators is desired to be kept constant such control may be caused by shutting off the by-pass by means of a valve 91 at the gear motor, whose corresponding generator is desired to run on constant output.

What I claim is:

1. In a plant, the combination of pressure medium generators comprising pumps driven by internal combustion engines, a communication between delivery portions of said generators, a control device for regulating the speed of at least two of said internal combustion engines to maintain the operation thereof in desired speed relation with respect to each other, a shaft in said control device common for said controlled internal combustion engines, a liquid pump coupled to each one of the controlled internal combustion engines, a liquid motor corresponding to each one of said liquid pumps and elastically connected to said shaft and communicating with and driven by the pertaining liquid pump, fuel supply control devices for each one of the controlled internal combustion engines responsive to the pressure in the communication between the pertaining liquid pump and the liquid motor, means adapted to influence the pressure in said communications upon a certain angular displacement of one of said liquid motors relatively to said shaft, so that said pressure which actuates the fuel supply control device of the pertaining internal combustion engine is changed corresponding to said angular displacement, whereby to tend to bring the speeds of the controlled engines to said desired speed relation.

2. In a plant, the combination of pressure medium generators comprising pumps driven by internal combustion engines, a communication between delivery portions of said generators, a control device for regulating the speed of two or more of said internal combustion engines to maintain the operation thereof in desired speed relation with respect to each other, a shaft in said control device common for said controlled internal combustion engines, a liquid pump coupled to each one of the controlled internal combustion engines, a liquid motor comprising a gear pump working as a motor corresponding to each one of said liquid pumps and communicating with and driven by the pertaining liquid pump, a gear wheel in each liquid motor provided with a duct and rotatably mounted on and connected to said common shaft by means of an elastic coupling, openings in said shaft corresponding to the ducts in said gear wheels and adapted to open a by-pass at the respective gear motors upon turning of the gear wheel a certain angle relatively to the shaft, and a fuel supply control device for each generator responsive to the pressure in the communication between the pertaining liquid pump and liquid motor and adapted to reduce the fuel supply to the generator upon opening of said by-pass.

3. In a plant, the combination of pressure medium generators comprising pumps driven by internal combustion engines, a communication between delivery portions of said generators, a control device for regulating the speed of at least two of said internal combustion engines to maintain the operation thereof in desired speed relation with respect to each other, a rotatable member in said control device common for said controlled internal combustion engines, a liquid pump coupled to each one of the controlled internal combustion engines, a liquid motor for each controlled internal combustion engine displaceably connected with said rotatable member and driven by the pertaining liquid pump, communications between said liquid pumps and the pertaining liquid motors, fuel supply control devices for each one of the controlled internal combustion engines responsive to the pressure of the liquid in the communication between the pertaining liquid pump and the pertaining liquid motor, and means in said liquid motors adapted to influence the pressure in said pertaining communication upon displacement of the pertaining liquid motor relatively to the rotatable member, whereby to tend to bring the speeds of the controlled engines to said desired speed relation.

4. In a plant, the combination of pressure medium generators comprising pumps driven by internal combustion engines, a communication between delivery portions of said generators, a control device for regulating the speed of at least two of said internal combustion engines to maintain the operation thereof in desired speed relation with respect to each other, a rotatable member in said control device common for said controlled internal combustion engines, a liquid pump coupled to each one of the controlled internal combustion engines, a liquid motor for each controlled internal combustion engine displaceably connected with said rotatable member and driven by the pertaining liquid pump, a communication between each liquid pump and the pertaining liquid motor, fuel supply control devices for each one of the controlled internal combustion engines responsive to the pressure of the liquid in the communication between the pertaining liquid pump and the pertaining liquid motor, means in said liquid motors adapted to influence the pressure in said pertaining communication upon displacement of the pertaining liquid motor relatively to the rotatable member to thereby adjust the fuel supply control device of the pertaining internal combustion engine so as to tend to restore said desired speed relation, and auxiliary adjustable means provided in said communications between the liquid pumps and the liquid motors and adapted to influence the pressure of the liquid in the communication and thereby the fuel supply control devices of the controlled internal combustion engines.

JOHAN ERIK JOHANSSON.